Figure 1:
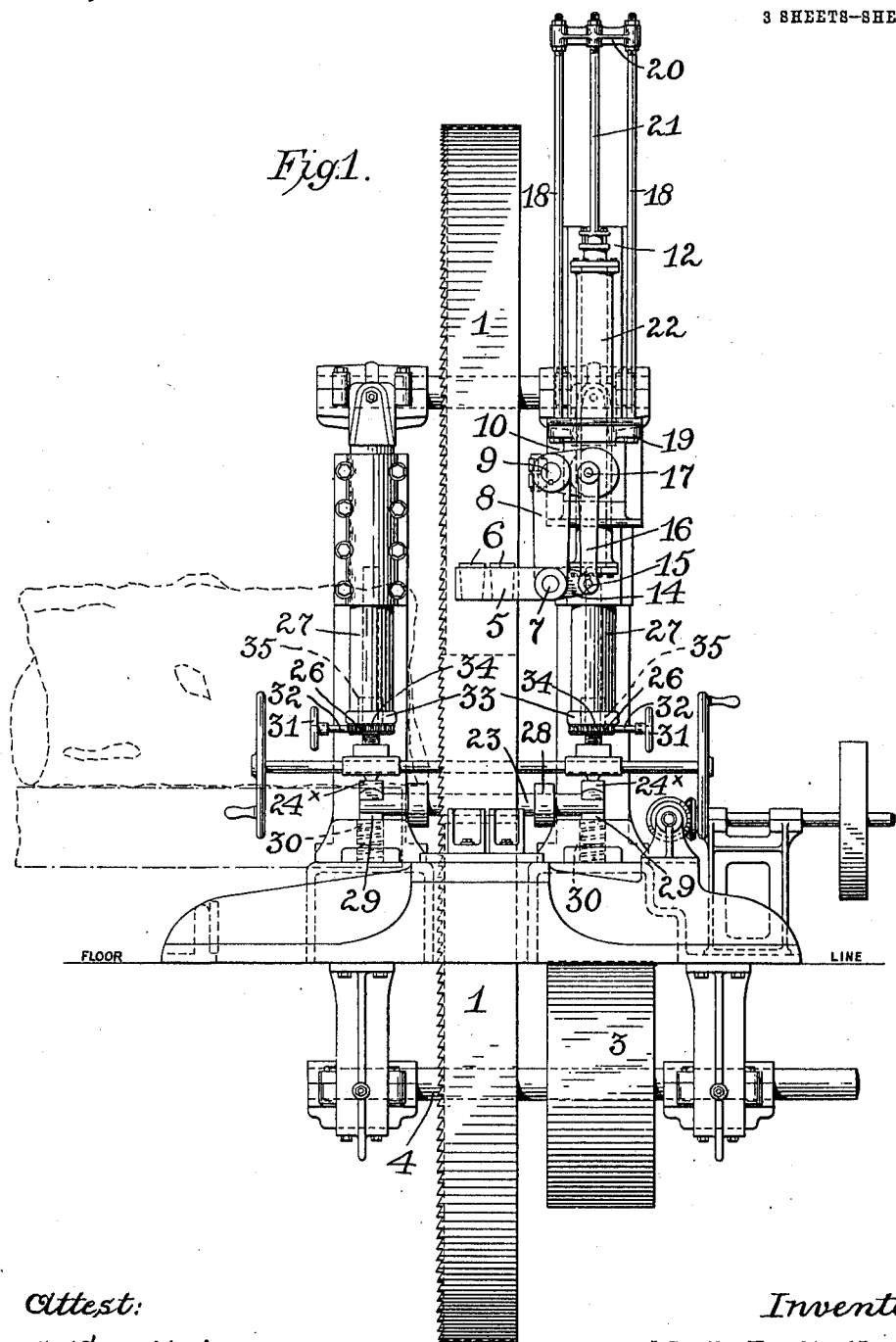

A. D. CATLIN.
BAND SAW MILL.
APPLICATION FILED OCT. 11, 1909.

992,160.

Patented May 16, 1911.
3 SHEETS—SHEET 1.

Attest:
Ed. L. Tolson.
Edward N. Sarton

Inventor:
Abel D. Catlin,
By Spear, Middleton, Donaldson & Spear
Attys.

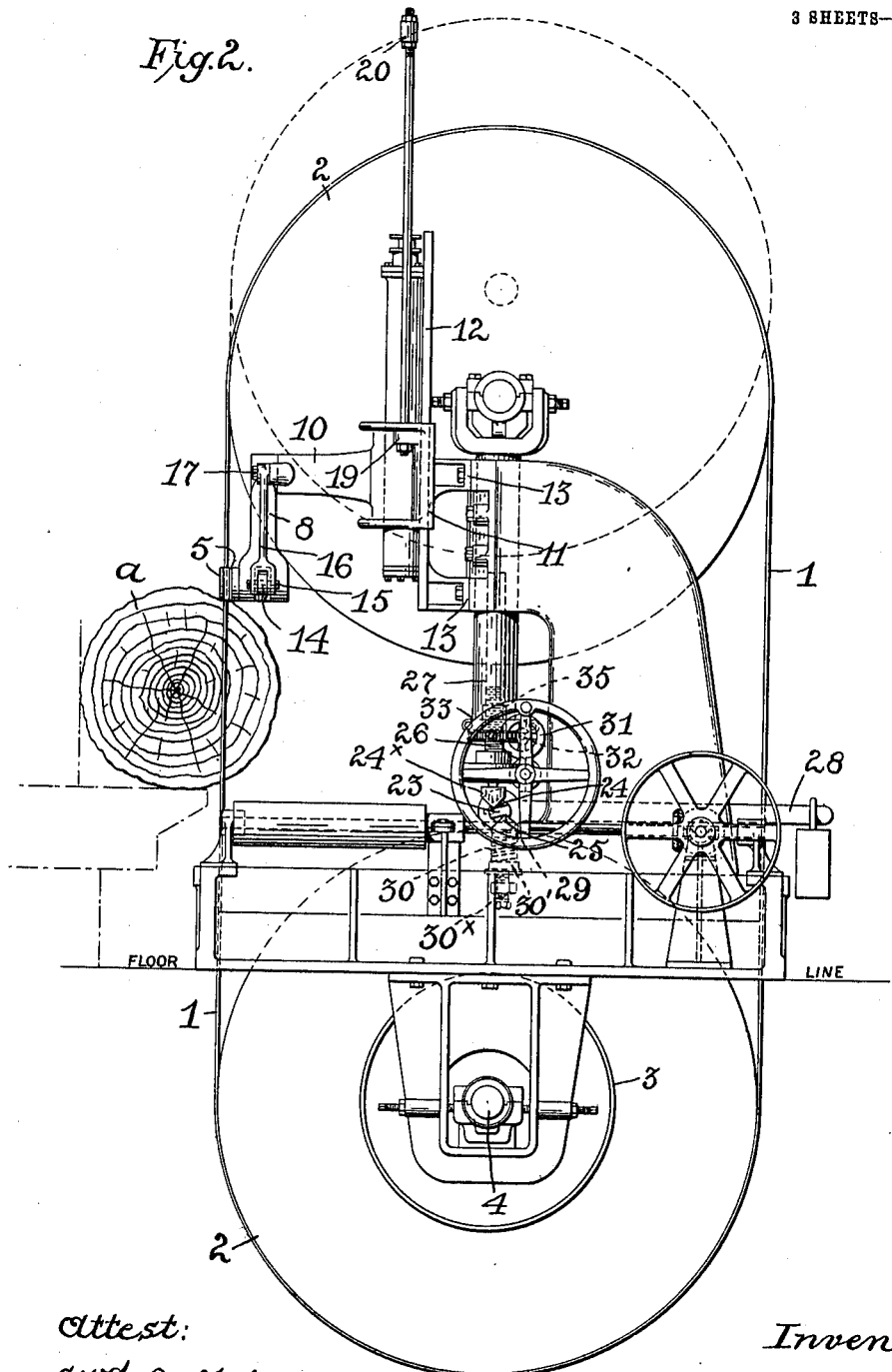

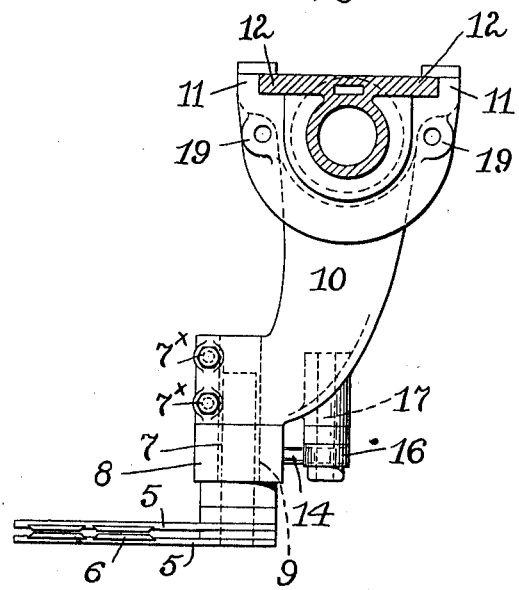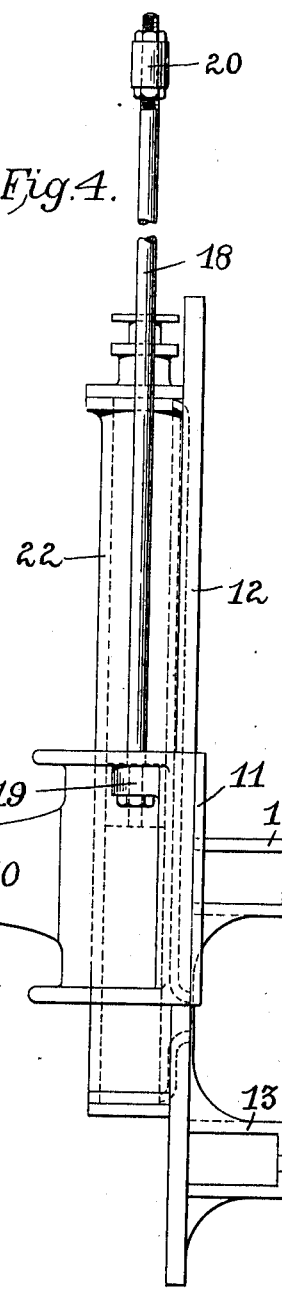

UNITED STATES PATENT OFFICE.

ABEL D. CATLIN, OF CHATTANOOGA, TENNESSEE.

BAND-SAW MILL.

992,160.　　　　　Specification of Letters Patent.　　Patented May 16, 1911.

Application filed October 11, 1909. Serial No. 522,053.

*To all whom it may concern:*

Be it known that I, ABEL D. CATLIN, citizen of the United States, residing at Chattanooga, Tennessee, have invented certain new and useful Improvements in Band-Saw Mills, of which the following is a specification.

My invention relates to band mills employing a saw or cutter in the form of an endless band, and it concerns more particularly means for guiding the band saw at a point adjacent to the log or other piece being sawed.

The invention consists in the features of construction and combination and arrangement of parts hereinafter described and particularly pointed out in the appended claims.

In the accompanying drawings, Figure 1 is a side view of a band mill embodying my invention; Fig. 2 is a rear view of the machine with my improvements in place; Fig. 3 is a plan view of the band saw guide with the bracket for supporting the same, and guideway and motor cylinder; Fig. 4 is a rear view of the guide, its movable bracket and operating means.

In these drawings, the band cutter or saw 1 is of substantially ordinary form, it passing around guide wheels 2, the lower one of which is driven through a pulley 3 on the same shaft 4 with the band cutter. The log or article to be sawed is presented to the band saw in a manner well known to those skilled in the art, the log being here indicated at *a*. In order to guide the saw adjacent to its point of work, I provide a guiding device consisting of a pair of plates or arms 5, 5, arranged parallel with each other, and with a space between them, the said arms having fixedly mounted, on their opposing ends, pieces 6, leaving a crevice between them of a width equal to the thickness of the band saw, the said pieces presenting wearing surfaces for the accurate guidance of the saw adjacent its point of work. The guide arms are carried by a pivot pin 7 mounted in the lower end of an arm 8, which is pivotally mounted at 9 to a bracket 10, which bracket has its rear portion provided with flanges 11 embracing vertically extending guideways 12, which are fixed to the framework of the machine in any suitable manner, as at 13 in Fig. 2. The guide arms 5, with their pin 7, are associated with a supplemental arm 14 fixed to the pin 7, and extending laterally therefrom, the end of said arm being pivotally connect-ed at 15 to a link 16 which, at its upper end, is pivotally mounted at 17 on the bracket 10, and in the same horizontal plane with the pivot 9 of the supporting arm 8 of the band saw guide. The pivots 7 and 15, at the lower ends of the arm 8 and link 16, respectively, are also in the same horizontal plane. The arm 8 and the link 16 are free to turn about their upper pivots, and are thus adapted to allow the guide arms 5 to move rearwardly in respect to the band saw, and this action will take place whenever a protuberance or knot on the log strikes the end of the guide arms 5. In other words, the guide arms may be set in position close to the point of work, and they will accommodate themselves automatically to irregularities on the surface of the log being sawed, for should a projecting knot or other protuberance or irregular portion arrive at the point where the saw is operating, and strike the guide, the said guide will recede laterally, at the same time maintaining its parallelism with its original position, but lifting slightly due to the rising arc through which the pivots 7 and 15 move when the arm 8 and link 16 swing to one side. This arrangement will permit the sawing or cutting action to be continued, and when the knot or protuberance passes from beneath the guide arms 5, the said arms will remain in their new position and hold the guide up so that on the return of the log the protuberance or knot will pass freely thereby. This effect is due to the mounting of the pin 7 in the split end of the bracket 10, and the pressure which is brought to bear on the pin by tightening the clamping nuts 7×. By the arrangement described, it will be noticed that the saw guide can be adjusted close to the point of work, and no damage or breakage will result from the arrival of the knots or protuberances at the cutting point, or the travel thereof past the band saw guide.

In order to adjust the saw guide vertically, the bracket 10, as above stated, is mounted on the guide 12, and rods 18 extend up from their point of connection with the base of the bracket at 19 to a crosshead 20 connected with a piston rod 21, the piston of which operates within a cylinder 22 mounted on the frame of the apparatus, and to which motive fluid is supplied in any suitable manner to raise or lower the piston and the connected guide bracket, and to hold said parts in their adjusted position.

In machines of this character it is necessary to place a tension strain on the band saw in order to make it cut straight and stay on the wheels. Mechanism for this general purpose is usual in machines using band saws. In my machine, I employ for this purpose a shaft 23 which is milled on each end to provide knife edges 24, 25. The ends of screws 26 are seated in and are free to revolve in the knife edges 24×. The upper ends of these screws are free to rotate in the columns 27 which, in turn, are free to move vertically in the main standard or housing. A weight lever 28 is fixed to the shaft 23, so that it tends to turn the same and cause the edges 24 to lift the screws 26 and the columns 27, and thus raise the upper band carrying wheel upwardly, and by adjusting weights on the lever, the desired tension may be obtained on the band saw. The lower knife edges 25 rest on blocks 29 which, in turn, rest on springs 30 adjustable by screws 30× and interposed blocks 30′, and these springs carry the total weight of the upper wheel and its supports.

It sometimes happens that splinters, pieces of bark, or other matter drops between the band saw and the periphery of the lower wheel, and in some cases, will cause the band saw to break in case the upper wheel could not lower quickly enough to relieve the strain. In my machine, the automatic relief just mentioned is derived from the use of the springs 30 which allow the shaft 23 to lower, together with the upper wheel when any obstructive material, such as chips, bark, etc., lodge between the band saw and the surface of the lower wheel.

For adjusting the upper wheel so that its surface will be in a horizontal plane, and thus maintain the saw thereon, I provide hand wheels 31 which are connected to worm shafts 32 mounted in ears of collars 33, the said shafts carrying each a worm to mesh with the worm wheel 34, which are connected with the nuts 35 which work on the screws 26, so that, by turning the nuts, the screws may be moved up or down to adjust the axis of the upper wheel to make it run in a vertical plane.

I claim as my invention:

1. In combination with a band saw, a pivoted depending arm, a guide mounted pivotally on the lower end of said arm to yield in the direction of feed of the material operated on, and to rise from the path of said material by swinging on the pivot of said arm, means for maintaining said guide horizontal during its movement, and means for frictionally controlling the pivotal movement of the arm so that the guide may remain in the position to which it is elevated, substantially as described.

2. In combination in a band saw, a guide extending horizontally and having a laterally extending pin, an arm pivoted at its upper end, and supporting the said laterally exending pin at its lower end, which pin is adapted to turn in the arm, an arm extending from the pin rearwardly and in a plane parallel with the guide, and a supplemental arm pivotally supported at its upper end and pivotally connected at its lower end with the rearwardly extending arm, substantially as described.

3. In combination with a band saw, a guide, a pivotally mounted depending arm to which the guide is pivoted, said guide having a rearwardly extending arm, a supplemental arm pivotally connected to the rearwardly extending arm and pivotally supported at its upper end, and a friction clamp device at the pivot of the depending arm for placing said arm under frictional restraint, substantially as described.

In testimony whereof, I affix my signature in presence of two witnesses.

ABEL D. CATLIN.

Witnesses:
M. V. MINOR,
A. R. MCKENZIE, Jr.

---

Copies of this patent may be obtained for five cents each, by addressing the "Commissioner of Patents Washington, D. C."